(12) United States Patent
Gardes et al.

(10) Patent No.: US 9,197,844 B2
(45) Date of Patent: Nov. 24, 2015

(54) USER INTERFACE

(75) Inventors: Laurent Gardes, Meudon (FR); Yann Prat, Elancourt (FR); Olivier Lacour, Paris (FR); Berangere Lallemant, Paris (FR)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/238,126

(22) PCT Filed: Sep. 6, 2012

(86) PCT No.: PCT/IB2012/054619
§ 371 (c)(1),
(2), (4) Date: Feb. 24, 2014

(87) PCT Pub. No.: WO2013/035068
PCT Pub. Date: Mar. 14, 2013

(65) Prior Publication Data
US 2014/0196089 A1    Jul. 10, 2014

Related U.S. Application Data

(60) Provisional application No. 61/573,536, filed on Sep. 8, 2011.

(51) Int. Cl.
| | |
|---|---|
| *G09G 5/00* | (2006.01) |
| *H04N 5/91* | (2006.01) |
| *H04N 21/41* | (2011.01) |
| *H04N 21/422* | (2011.01) |
| *H04N 21/4722* | (2011.01) |
| *H04N 21/81* | (2011.01) |
| *H04N 21/472* | (2011.01) |

(52) U.S. Cl.
CPC .............. *H04N 5/91* (2013.01); *H04N 21/4104* (2013.01); *H04N 21/4126* (2013.01); *H04N 21/42209* (2013.01); *H04N 21/4722* (2013.01); *H04N 21/47208* (2013.01); *H04N 21/8133* (2013.01)

(58) Field of Classification Search
CPC combination set(s) only.
See application file for complete search history.

(56) References Cited

U.S. PATENT DOCUMENTS

| | | |
|---|---|---|
| 2004/0183756 A1 | 9/2004 | Freitas et al. |
| 2008/0284907 A1 | 11/2008 | Chiao |

(Continued)

FOREIGN PATENT DOCUMENTS

| | | |
|---|---|---|
| EP | 2 392 993 A2 | 12/2011 |
| WO | WO 2009/038596 A1 | 3/2009 |

OTHER PUBLICATIONS

Jan. 8, 2013 Transmittal of the International Search Report and Written Opinion of the International Searching Authority for PCT/IB2012/054619.

(Continued)

*Primary Examiner* — Robin Mishler
(74) *Attorney, Agent, or Firm* — Hahn Loeser & Parks LLP (57) ABSTRACT

A method is described. The method includes: displaying a user interface on a first display device associated with a client device, the user interface enabling user interaction with the client device; enabling an electronic device to control the client device; detecting an orientation change of the electronic device; and displaying the user interface on a second display device associated with the electronic device upon detecting the orientation change. Related methods and apparatus are also disclosed.

20 Claims, 6 Drawing Sheets

(56) References Cited

U.S. PATENT DOCUMENTS

| | | |
|---|---|---|
| 2009/0153289 A1 | 6/2009 | Hope et al. |
| 2010/0060569 A1 | 3/2010 | Shamilian |
| 2010/0070997 A1 | 3/2010 | Friedman |
| 2010/0245680 A1 | 9/2010 | Tsukada et al. |
| 2011/0026765 A1 | 2/2011 | Ivanich et al. |
| 2012/0081277 A1* | 4/2012 | de Paz .......................... 345/156 |

OTHER PUBLICATIONS

Stephen Wildstrom, "Tablet Turned Remote Control: Demo of How This Works," available at http://www.youtube.com/watch?v=y_PTJlrPMAO on Jul. 2, 2012.

* cited by examiner

USER INTERFACE

The present application is a 35 USC §371 submission of international application no. PCT/IB2012/054619, which was filed on 6 Sep. 2012 and which was published on 14 Mar. 2013 in the English language with publication no. WO 2013/035068 A1, which claims the benefit of the filing date of U.S. Ser. No. 61/573,536, filed 8 Sep. 2011.

FIELD OF THE INVENTION

The present invention relates to systems and methods for automatically adapting a User Interface display according to an operating mode of a companion device.

BACKGROUND OF THE INVENTION

A user interface (UI) is used to provide an easy and efficient way to use a digital device. A user may interact with a UI displayed on a screen associated with the digital device, using an input unit such as a touch screen, keypad, touch pad, keyboard or pointing device, and can thereby control the digital device to perform a desired operation.

It is also possible for a user to interact with a UI on a first digital device in order to control a second digital device.

Certain types of devices, such as a mobile telephone, a tablet computer or other handheld device, which can be used as a second digital device as described above, may comprise an orientation module (e.g. an accelerometer) that detects the orientation of the device. As the user rotates the device from landscape to portrait mode, the orientation module detects this change and causes the device to respond by adjusting the UI to match the new orientation.

SUMMARY OF THE INVENTION

There is thus provided in accordance with an embodiment of the present invention, a method including: displaying a user interface on a first display device associated with a client device, the user interface enabling user interaction with the client device; enabling an electronic device to control the client device; detecting an orientation change of the electronic device; and displaying the user interface on a second display device associated with the electronic device upon detecting the orientation change.

Further, in accordance with en embodiment of the present invention, the method further includes: detecting a further orientation change of the electronic device; displaying the user interface on the first display device associated with the client device upon detecting the further orientation change.

Still further, in accordance with en embodiment of the present invention, the detecting an orientation change of the electronic device includes detecting a rotation of the electronic device around an axis perpendicular to a plane of the second display device.

Additionally, in accordance with en embodiment of the present invention, the detecting an orientation change of the electronic device includes: detecting a rotation of the electronic device around an axis perpendicular to a plane of the second display device and a rotation of the electronic device around an axis parallel to a plane of the second display device.

Further, in accordance with en embodiment of the present invention, the detecting a further orientation change of the electronic device includes detecting a rotation of the electronic device around an axis perpendicular to a plane of the second display device.

Still further, in accordance with en embodiment of the present invention, the detecting a further orientation change of the electronic device includes detecting a rotation of the electronic device around an axis perpendicular to a plane of the second display device and a rotation of the electronic device around an axis parallel to a plane of the second display device.

Additionally, in accordance with en embodiment of the present invention, the enabling an electronic device to control the client device includes: pairing the electronic device to the client device; and enabling a user of the electronic device to interact with the user interface displayed on the first display device.

Further, in accordance with en embodiment of the present invention, the displaying the user interface on a second display device includes: saving visual and execution states of the user interface displayed on the first display device at a time the orientation change is detected; customizing the user interface according to characteristics of the second display device; and displaying the customized user interface on the second display device, the customized user interface being resumed on the second display device at the saved visual and execution states.

Still further, in accordance with en embodiment of the present invention, the characteristics include one of more of: aspect ratio, dimension, or resolution of the second display device.

Additionally, in accordance with en embodiment of the present invention, the customizing the user interface includes retrieving relevant metadata suitable for use on the second display device.

Further, in accordance with en embodiment of the present invention, the displaying the user interface on the first display device includes: saving visual and execution states of the user interface displayed on the second display device at a time the further orientation change is detected; customizing the user interface according to characteristics of the first display device; and displaying the customized user interface on the first display device, the customized user interface being resumed on the first display device at the saved visual and execution states.

Still further, in accordance with en embodiment of the present invention, the characteristics include one of more of: aspect ratio, dimension, or resolution of the first display device.

Additionally, in accordance with en embodiment of the present invention, the customizing the user interface includes retrieving relevant metadata suitable for use on the first display device.

Further, in accordance with en embodiment of the present invention, the displaying the user interface on a second display device includes: stopping displaying the user interface on the first display device; and synchronizing the stopping displaying the user interface on the first display device and the displaying the user interface on the second display device according to a visual animation.

Still further, in accordance with en embodiment of the present invention, the synchronizing includes: defining a start time and a duration for the visual animation; and starting the stopping displaying and displaying operations at the defined start time to be performed for the duration.

There is also provided with a further embodiment of the present invention, a system including: a client device; a first display device associated with the client device and operable to display a user interface, the user interface enabling user interaction with the client device; and an electronic device operable to control the client device, the electronic device including: an orientation module operable to detect an orientation change of the electronic device; and a second display device; wherein the second display device is operable to display the user interface upon the orientation module detecting an orientation change of the electronic device.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order not to obscure the general concepts unnecessarily.

Although the principles of the present invention are largely described herein in relation to a television broadcast environment and related television applications, this is an example selected for convenience of presentation, and is not limiting.

System Architecture

Figure 1:
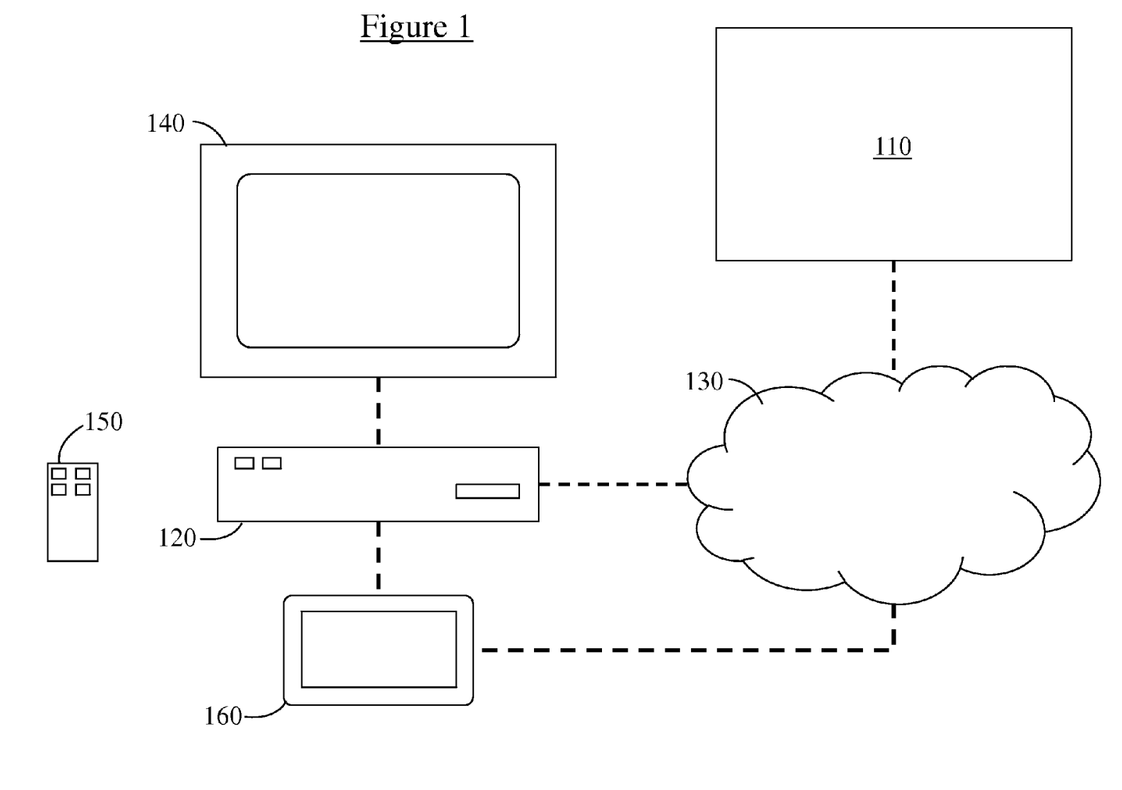
FIG. 1 is a simplified block diagram illustration of a system constructed and operative in accordance with an embodiment of the present invention.

Reference is now made to FIG. 1, which is a simplified block diagram illustration of a system constructed and operative in accordance with an embodiment of the present invention.

A headend 110 typically communicates with a plurality of client devices via a communication network 130. Additionally or alternatively, a plurality of headends communicate with a single client device or with a plurality of client devices via the communication network 130. For simplicity of depiction and description, and without limiting the generality of the invention, one client device 120 is depicted in FIG. 1 as being in operative communication (via communication network 130) with one headend 110.

The communication network 130 is a one-way or two-way communication network that includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; and a computer based communication network. It is appreciated that in alternative embodiments, the communication network 130 may, for example, be implemented by a one-way or two-way hybrid communication network, such as a combination cable-telephone network, a combination satellite-telephone network, a combination satellite-computer based communication network, or by any other appropriate network. Other ways of implementing the communication network 130 will be apparent to someone skilled in the art.

The system of FIG. 1 comprises a client device 120 disposed between a headend 110 and a display device 140. Client device 120 is coupled to a display device 140. Client device 120 typically comprises a tuner, a decoder, a receiver and a descrambler. It is appreciated that the client device 120 comprises standard hardware components and software components, as is well known in the art.

Client device 120 is typically connected in operation to display device 140 via a digital AV interface (e.g. HDMI, DVI, etc.) or via an analogue AV interface (e.g. component (RGB, YPbPr), composite (NTSC, PAL, SECAM), S-video, SCART, RF coaxial, D-Terminal (D-tanshi) etc.). While shown as separate entities in FIG. 1, the client device 120 may be integral with the display device 140 in other embodiments of the present invention.

Client device 120 typically receives audio visual (AV) signals from e.g. a broadcast stream, a VOD library, etc., as well as related digital data. The client device typically decodes and decrypts/descrambles as necessary the AV signals received from a headend 110 optionally under control of a conditional access device such as removable security element as is well known in the art. The removable security element typically includes a smart cart as is well known in the art. The output from client device 120 comprises a decoded and decrypted/descrambled as necessary audio video (AV) signals ready to be displayed on the display device 140. Furthermore, the client device 120 typically runs onboard software stored within a memory of the client device 120, the onboard software comprising applications (e.g. electronic program guide (EPG), pay-per-view (PPV) resident application, video-on-demand (VOD) resident application, etc.), an intermediate software layer (middleware), software layers for controlling the device layer interface that provides an interface between the middleware and the decoder hardware controllers, and all other layers used to operate the client device 120.

Client device 120 is typically controlled by a user, for example via a remote control unit (RCU) 150. Client device 120 can receive control commands from the RCU 150 (e.g. via infra-red communication). RCU 150 is used by a user to select an AV content to view, such as a live event broadcast, a Video-On-Demand (VOD) asset, a recorded event, etc., or to select a particular application to run, such as an EPG, a PPV application, a VOD application, etc., which is then displayed on the display device 140. The onboard software within client device 120 monitors user interaction with the client device 120 so that the relevant information is displayed on the display device 140 in response to a user command entered using the RCU 150.

Furthermore, an electronic device 160 is provided that is operable to communicate with the client device 120 using any suitable connectivity link (e.g. wired, WiFi, Bluetooth, RF, etc.). The electronic device 160 is further operable to communicate with the headend 110 through the communication network 130. FIG. 1 shows only one communication network 130. However, those skilled in the art will appreciate that the electronic device 160 may communicate directly with the headend 110 using the same communication network 130 or a different communication network. The electronic device 160 may be for example, but without limiting the generality of the invention, a companion device such as a laptop computer, a desktop or personal computer (PC), a tablet computer such as an iPad™, a mobile computing device, such as a Personal Digital Assistant (PDA), mobile phone, or any handheld device. The electronic device 160 typically comprises a processor, a video player, a rendering screen for displaying content and data information to a user and an orientation module (such as, for example, and without limiting the generality of the invention, an accelerometer sensor, a gyroscope, a manual switch, etc.) operative to detect the orientation of the electronic device 160. The orientation module is typically operable to detect a rotation of the electronic device 160 around an axis perpendicular to the plane of its rendering screen and/or a rotation of the electronic device 160 around an axis parallel to the plane of its rendering screen.

A user is typically able to select an application to be run on the electronic device 160. The application may be locally executed on the electronic device 160 thereby enabling communication with the client device 120 and the headend 110. The application run on the electronic device 160 is typically able to pair the electronic device 160 with the client device 120 to enable electronic device 160 to control client device 120. In another embodiment of the present invention, the pairing operation is achieved using the client device 120. Pairing two devices typically comprises setting a first device into a discoverable mode while a second device requests to be associated with the first device. Upon detection of the first device by the second device, the two devices are associated and a connection is established. Once paired together, the electronic device 160 and the client device 120 may communicate according to a messaging system. The user is then able to use the electronic device 160 as a:

RCU operative to send messages to the onboard software of client device 120 and therefore, to provide some control of the client device 120; and/or second display device operative to display an interactive UI that offers the user an enhanced level of control over client device 120.

Operation

Figure 2:
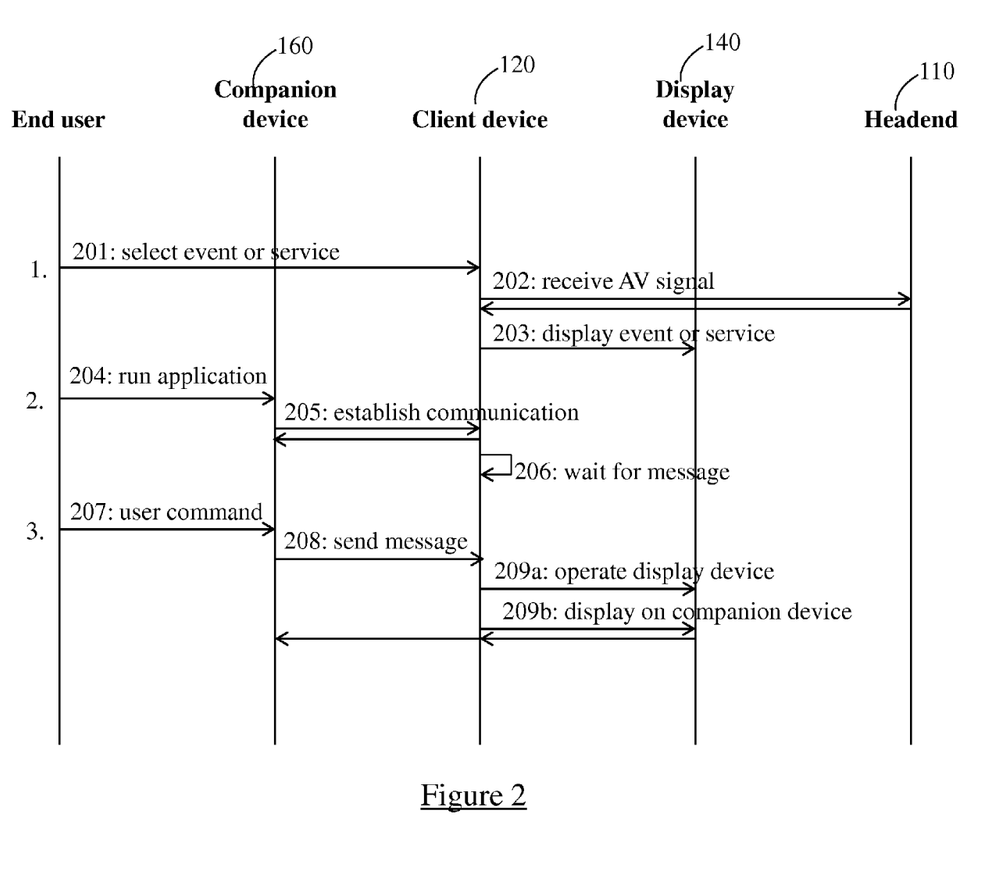
FIG. 2 is an information flow diagram showing the information flows between the different apparatuses of the system of FIG. 1 in accordance with embodiments of the present invention.

Reference is now made to FIG. 2, which is an information flow diagram showing the information flows between the different apparatuses of the system in accordance with embodiments of the present invention.

At step 201, the user may select an event or a service (sometimes also referred to as a program or channel) to be displayed on the display device 140 by operating a RCU 150 e.g. a remote control. Upon reception of the user's selection, the client device 120 may receive an AV signal sent from the headend 110. The client device receives at step 202 the AV signal. Then, the client device 120 decodes and decrypts/descrambles as necessary the AV signal received from a headend 110 and displays the selected event or service on the display device 140 (step 203).

While watching the displayed event or service, the user may decide at step 204 to run an application on the electronic device 160, hereinafter referred as the companion device 160 in the present specification. The application is typically executed locally on the companion device 160 and a connection is first established with the client device 120. Those skilled in the art will appreciate that in some embodiments of the present invention, the application may also be implemented as a distributed computing application and therefore that the application may be executed in any or in a plurality of suitable computing devices of a distributed computing system. This connection is typically established through a traditional pairing operation causing the client device 120 and the companion device 160 to be associated with each other, so that they may communicate according to a messaging system. In another embodiment of the present invention, the client device 120 and companion device 160 can also be configured to communicate by the user logging into a same user account on each device and connecting each device to the same communications network. In some embodiments, the pairing operation will occur in the background (i.e. it is invisible to the user) and no further user input is required. Other ways of associating the companion device 160 and the client device 120 will be apparent to someone skilled in the art.

Upon completion of the pairing operation 205, communication between the two devices is enabled, thus enabling companion device 160 to control client device 120. The two devices may communicate using a messaging system such as the Simple Object Access Protocol (SOAP) messaging system. SOAP is a protocol specification for exchanging structured information in the implementation of web services in computer networks. It relies on eXtensible Markup Language (XML) for its message format, and usually relies on other application layers protocols, most notably HyperText Transfer Protocol (HTTP), Transmission Control Protocol and Internet Protocol (TCP/IP), and Simple Mail Transfer Protocol (SMTP), for message negotiation and transmission. SOAP can form the foundation layer of a web services protocol stack, providing a basic messaging framework upon which web services can be built. This XML based protocol consists of three parts: an envelope, which defines what is in the message and how to process it; a set of encoding rules for expressing instances of application-defined data types; and a convention for representing procedure calls and responses. Those skilled in the art will appreciate that any suitable messaging system may be used by the client device 120 and companion device 160 in order to communicate. At the end of the pairing operation 205, the client device 120 is therefore able to receive and identify a message sent by the companion device 160. At step 206, the client device 120 waits for an incoming message.

The companion device 160 may be operated in two different modes according to the orientation of the companion device 160. The orientation module within companion device 160 detects the orientation of the companion device 160 and one of the two following operating modes is enabled according to the detected orientation:

a first operating mode—hereinafter referred to as the portrait mode in the present specification—is enabled when the orientation module detects that the companion device 160 is held by the user in a vertical position. This portrait mode comprises using the companion device 160 as a RCU (step 207) operative to send messages (step 208) to the onboard software of client device 120 (in response to a command entered by the user on the companion device 160) and therefore, to control the client device 120 (step 209*a*) to switch from one service to another, start a recording, increase or decrease the volume, display an electronic program guide (EPG), display any other (interactive) application on display device 140 or interact with the UI displayed on the display device 140 associated to the client device 120, etc. The onboard software of the client device 120 receives and processes the message to execute the command entered by the user;

a second operating mode—hereinafter referred to as the landscape mode in the present specification—is enabled when the orientation module detects that the companion device is held by the user in horizontal position. This landscape mode comprises using the companion device 160 as a second display device operative to display an interactive UI that was previously displayed on the display device 140 (step 209*b*). The user is therefore able to view and interact with a UI comprising a plurality of different applications such as, for example, but without limiting the generality of the present invention, an EPG, a PPV resident application, a VOD resident application, etc. In response to a further command entered by the user on the companion device 160, a further message 208 is sent to the client device 120. The onboard software of the client device 120 receives and processes the further message to execute the further command entered by the user. In an embodiment of the present invention, the commands previously described in relation to the first operating mode (e.g. switch from one service to another, start a recording, increase or decrease the volume, display an electronic program guide, etc.) are also available to the user via the interactive UI. Furthermore, additional commands may be available to the user according to the second operating mode; and Upon detection of an orientation change, the companion device 160 may be switched from the portrait mode to the landscape mode and vice versa. The detected orientation change may be a rotation of the companion device 160 around an axis perpendicular to the plane of its rendering screen and/or around an axis parallel to the plane of its rendering screen.

Figure 3:
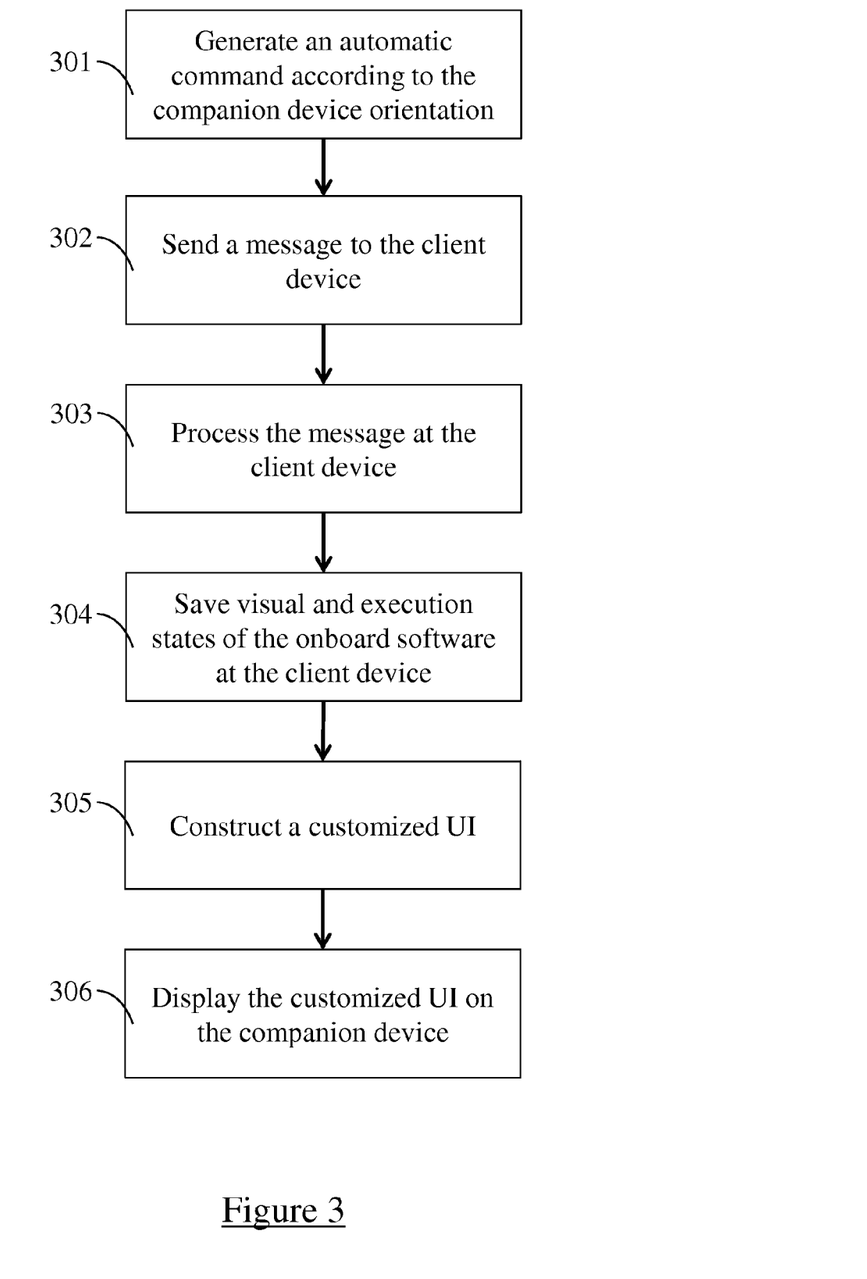
FIG. 3 is a flow chart of a method of automatically displaying a UI, displayed on a first digital device, on a screen of a second digital device in accordance with a further embodiment of the present invention.

Reference is now made to FIG. 3, which is a flow chart diagram of a method of automatically displaying a UI displayed on a display device 140, on a screen of the companion device 160 in accordance with a further embodiment of the present invention.

In a further embodiment of the present invention, an automatic message may be generated when the user rotates the companion device 160 from portrait to landscape mode and vice versa (step 301). The orientation module detects the change in the orientation of the companion device 160 and causes the companion device 160 operating system and software to respond by generating and sending a message to the client device 120 (step 302).

At step 303, the onboard software of the client device 120 receives and processes the message. This message may be a request for displaying a UI, currently being displayed on a first display device 140, on a second display device (i.e. screen of the companion device 160).

In response to the message, the client device 120 suspends the execution of the program applications currently being run by the onboard software and the visual and execution states of the program applications are saved within a memory of the client device 120. A program application typically comprises an ordered set of instructions and data that are processed in order to perform a particular task (e.g. running and displaying an EPG application, a PPV resident application, a VOD application, etc.). The visual state of a particular program application typically corresponds to the visual rendering of the program application on a first display device. The execution state of a particular program application typically corresponds to a position in the set of instructions and data currently being executed by the program application. Therefore, the visual and execution states of the program applications, currently being run by the onboard software at the time the client device 120 receives a message to display the UI on a second display device, are saved within a memory of the client device 120 (step 304).

At step 305, a customized UI is constructed to be displayed on the second display device. Those skilled in the art will appreciate that the UI may be partially or fully constructed by the client device 120, by the headend 110, or by a remote server and then delivered to the client device 120, or that the UI may be fully or partially constructed by the companion device 160. Constructing a customized UI typically comprises retrieving UI layouts and data for the different applications (e.g. EPG application, a PPV resident application, a VOD application, etc.), metadata (e.g. additional information and/or description of a program), and assets (e.g. a channel logo) having formats suitable for use by the second display device. It will be apparent to someone skilled in the art that any suitable protocol, such as SOAP or HTTP given as non-limiting examples, may be used to retrieve the different layouts and data from any suitable source. Furthermore, the saved visual and execution states of the program applications may be taken into consideration at this step so that the customized UI may be resumed at the same point on the screen of the companion device 160.

The UI customization operation may also take into consideration the different characteristics (e.g. aspect ratios, resolutions, dimensions etc.) of the display device 140 and the screen of the companion device 160. For example, but without limiting the generality of the invention, the appearance of the UI when displayed on the first display device 140 may be altered (e.g. resized, scaled, aspect ratio changed, etc.) to match the characteristics of the second display device. The UI customization may also alter the UI layout. For example, the customized UI may display less information on the screen of the companion device 160 than the display device 140 (although the amount of available information may be preserved).

At step 306, the customized UI is displayed on the second display device. The UI may be resumed at the same point as it was displayed on the first display device 140 by using the visual and execution states that were previously stored within a memory of client device 120. To do so, the stored visual and execution states may be used to construct the customized UI at step 305 or may be transferred to the companion device 160 to be used at step 306. Therefore, the customized UI displayed on the screen of the companion device 160 has the same 'look and feel' as the one displayed on the first display device 140 at the time the client device 120 received the message. Furthermore, the execution of the different program applications may be resumed from the saved position in the set of instructions and data. The user is then able to interact with the customized UI displayed on the screen of the companion device 160. Then, at the end of the process, a relevant operating mode (landscape mode in this situation) is enabled according to the orientation of the companion device 160. In a further embodiment of the present invention, when the customized UI is displayed on the screen of the companion device 160, the UI stops being displayed on the display device 140.

In a further embodiment of the present invention, a further orientation change of the companion device 160 may be detected when the user rotates the companion device 160 from landscape to portrait mode and therefore, an automatic message may be generated requesting display of the UI displayed on the screen of the companion device 160, on the first display device 140. It will be apparent to someone skilled in the art that the steps described previously may be performed in reverse order in order to display the UI displayed on the second display device on the first display device 140.

The onboard software of the client device 160 receives and processes the message. In response to the message, the companion device 160 suspends the execution of the program applications currently being run by the onboard software and the visual and execution states of the program applications are saved within a memory of the companion device 160.

Then, a customized UI is constructed to be displayed on the first display device. The saved visual and execution states of the program applications may be taken into consideration at this step so that the customized UI may be resumed at the same point on the display device 140. The UI customization operation may also comprise a resizing operation that takes into consideration the different characteristics (e.g. aspect ratios, dimensions, resolutions, etc.) of the display device 140 and the screen of the companion device 160. The UI displayed on the screen of the companion device 160 is typically scaled up to match the characteristics and dimensions of the first display device 140.

Finally, the customized UI is displayed on the first display device 140. The UI may be resumed at the same point as it was displayed on the screen of the companion device 160 by using the visual and execution states that were previously stored within a memory of companion device 160. To do so, the stored visual and execution states may be used to construct the customized UI at the previous or may be transferred to the display device 140 to be used at this step. The user is then able to interact with the customized UI displayed on the display device 140. A relevant operating mode (portrait mode in this situation) is enabled according to the orientation of the companion device 160. In a further embodiment of the present invention, when the customized UI is displayed on the display device 140, the UI stops being displayed on the screen of the companion device 160.

Figure 4A:
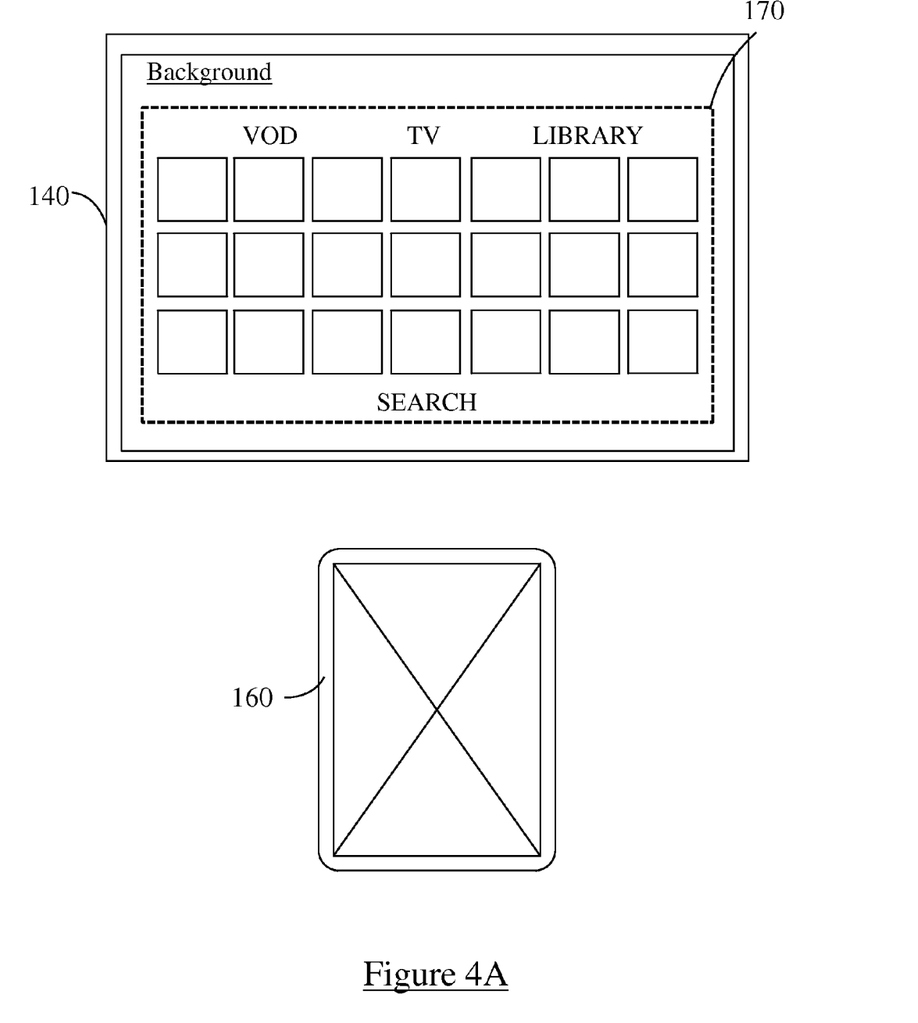
FIG. 4A to 4C are pictorial illustrations of methods of operating a second digital device according to embodiments of the present invention.
Figure 4B:
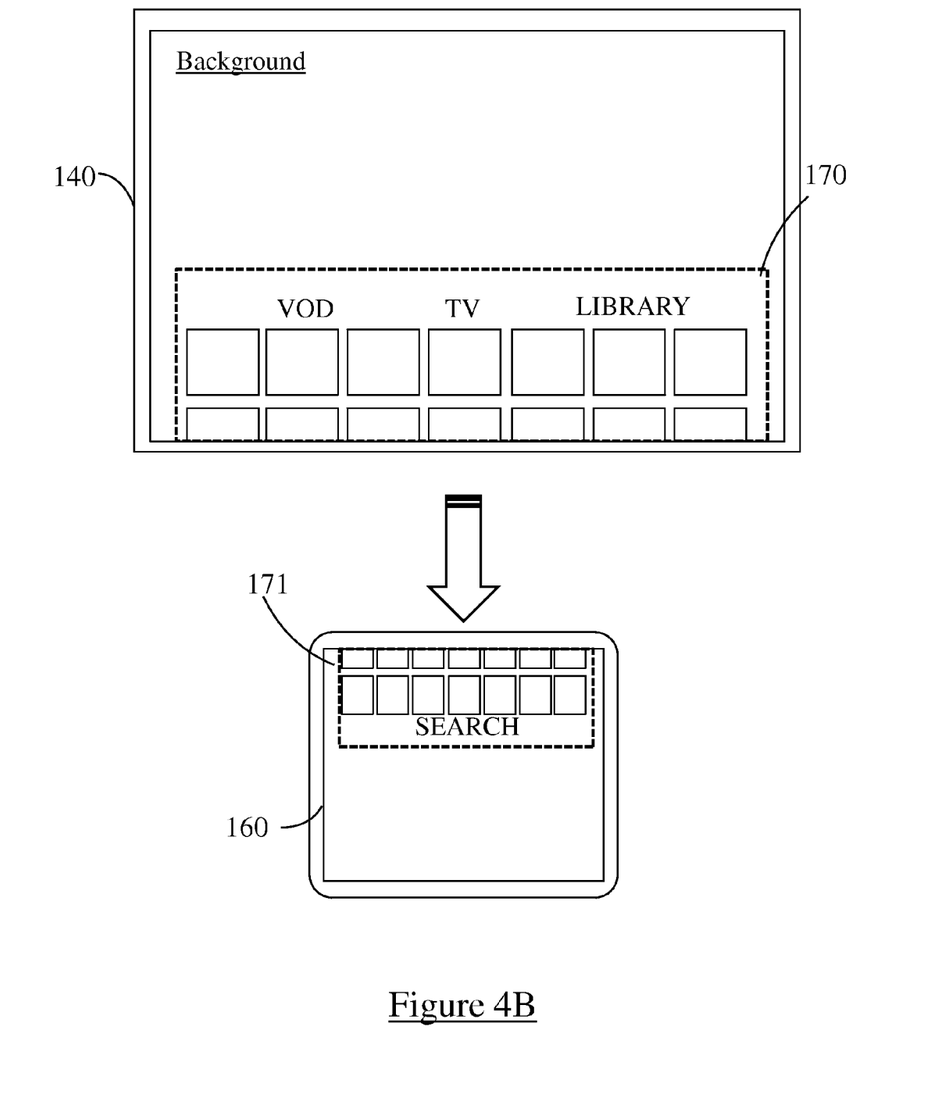
Figure 4C:
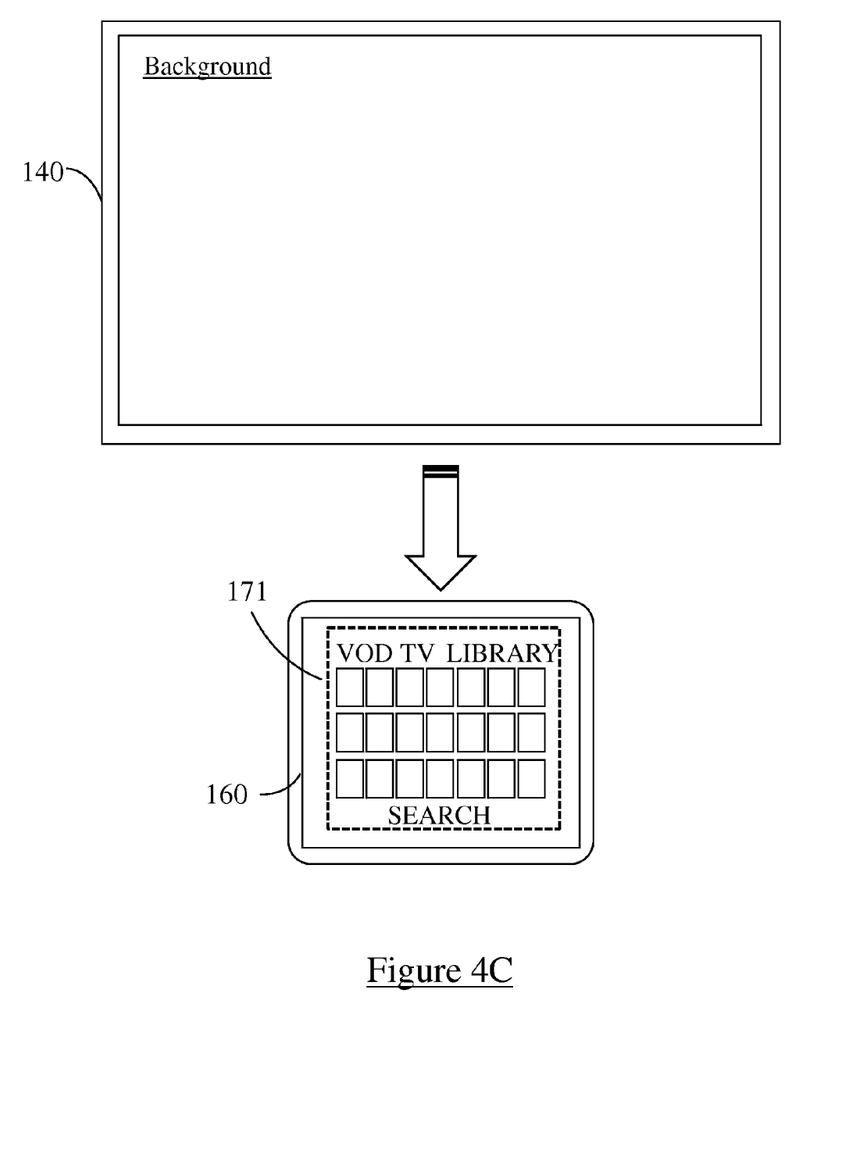

Reference is now made to FIG. 4A to 4C, which are pictorial illustrations of methods of operating a companion device according to embodiments of the present invention.

FIG. 4A shows a companion device 160 operated in portrait mode and displaying a UI 170. The companion device 160 is in vertical position and therefore, the portrait mode is enabled. The companion device 160 is used as a RCU operative to send messages to the onboard software of client device (not shown in FIG. 4A) and therefore, to operate the display device 140. The user is therefore able to enter commands to control the client device such as, for example, but without limiting the generality of the present invention, switching from one service to another, starting a recording, increasing or decreasing the volume, displaying an EPG or any other (interactive) application, switching from one application to another or from one screen to another, etc.

FIG. 4B shows the same companion device 160 that has been rotated and is now in horizontal position. As explained previously in relation to FIG. 3, rotating the companion device 160 from portrait to landscape mode generates an automatic message requesting the UI 170 currently being displayed on the display device 140 be displayed on the screen of companion device 160. FIG. 4B illustrates a visual effect that can be achieved according to certain embodiments of the present invention at the time a customized UI 171 starts being displayed on the companion device 160. According to embodiments of the present invention, once the customized UI 171 is constructed and ready to be displayed on the companion device 160, the UI 170 stops being displayed on the display device 140 and can be progressively removed. In parallel, the customized UI 171 can be progressively displayed on the companion device 160. The client device 120 typically synchronizes both operations to achieve a sliding visual animation thereby improving the user's viewing experience. It will be apparent to someone skilled in the art that any suitable visual animation may be chosen.

When the companion device 160 is ready to display the customized UI 171, a further automatic message may be generated informing the client device 120 of a start time and a duration of the visual animation. The client device 120 may respond to the companion device 160 by sending back to the companion device 160 another message confirming the start time or indicating a new start time of the visual animation. Therefore, a start time for starting the visual animation is defined that may be either the start time indicated by the companion device 160 or the delayed start time indicated by the client device 120. In any event, the removing and displaying operations start at a same defined time and are performed for the specified duration of the visual animation so that both operations end at a same time. According to embodiments of the present invention, at the end of the visual animation, the UI 170 is no longer displayed on the display device 140 but displayed instead on the screen of the companion device 160 as illustrated in FIG. 4C. Therefore, the removing and displaying operations are efficiently synchronized by specifying a start time and a duration of the visual animation.

In a further embodiment of the present invention, a similar synchronization may be achieved when the UI 171 stops being displayed on the screen of the companion device 160 by being progressively removed to be progressively displayed on the display device 140.

FIG. 4C shows the companion device 160 operating in landscape mode. The companion device 160 is in vertical position and therefore, the landscape mode is enabled. The companion device 160 is used as a second display device operative to display an interactive customized UI 171. The user is therefore able to view and interact with the customized UI 171 that comprises a plurality of different applications such as, for example, but without limiting the generality of the present invention, an EPG, a PPV resident application, a VOD resident application, etc.

Although the above embodiments have been described in the context of DVB implementation, someone skilled in the art will realize that other implementations are possible.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather the scope of the invention is defined by the appended claims and equivalents thereof.

The invention claimed is:

1. A method comprising:
displaying a user interface on a display device associated with a client device, said user interface enabling user interaction with said client device;
enabling an electronic device having a rendering screen to control said client device;
after said enabling, detecting a current orientation of said electronic device;
in response to said detected current orientation:
enabling a first operating mode if said detected current orientation corresponds to a first orientation of said electronic device, said first operating mode enabling a user of said electronic device to interact with said user interface displayed on said display device; and
enabling a second operating mode if said detected current orientation corresponds to a second orientation of said electronic device, said second operating mode comprising: rendering said user interface on said rendering screen of said electronic device; and enabling a user of said electronic device to interact with said user interface rendered on said rendering screen.

2. The method of claim 1, said method further comprising:
detecting an orientation change of said electronic device; and switching from said first to said second operating mode, or vice versa, in response to said detected orientation change.

3. The method of claim 2, wherein said detecting an orientation change of said electronic device comprises detecting a rotation of said electronic device around an axis perpendicular to a plane of said rendering screen.

4. The method of claim 2, wherein said detecting an orientation change of said electronic device comprises detecting a rotation of said electronic device around an axis perpendicular to a plane of said rendering screen and a rotation of said electronic device around an axis parallel to a plane of said rendering screen.

5. The method of claim 1, wherein said enabling an electronic device to control said client device comprises
pairing said electronic device to said client device.

6. The method of claim 1, wherein said rendering said user interface on said rendering screen comprises:
saving visual and execution states of said user interface displayed on said display device at a time said current orientation is detected;
customizing said user interface according to characteristics of said rendering screen; and
rendering said customized user interface on said rendering screen, said customized user interface being resumed on said rendering screen at said saved visual and execution states.

7. The method of claim 6, wherein said characteristics comprises one or more of: aspect ratio, dimension, and resolution of said rendering screen.

8. The method of claim 6, wherein said customizing said user interface comprises retrieving relevant metadata suitable for use on said rendering screen.

9. The method of claim 1, wherein said rendering said user interface on said rendering screen further comprises:
stopping displaying said user interface on said display device; and
synchronizing said stopping displaying said user interface on said first display device and said rendering said user interface on said rendering screen according to a visual animation.

10. The method of claim 9, wherein said synchronizing comprises:
defining a start time and a duration for said visual animation; and
starting said stopping displaying and rendering operations at said defined start time to be performed for said duration.

11. A system comprising:
a client device;
a display device associated with said client device and operable to display a user interface, said user interface enabling user interaction with said client device; and
an electronic device operable to control said client device, said electronic device comprising: an orientation module operable to detect a current orientation said electronic device, and a rendering screen;
wherein, in response to a current orientation detected by said orientation module, said electronic device is further operable to: enable a first operating mode when said detected current orientation corresponds to a first orientation of said electronic device, said first operating mode enabling a user to interact with said user interface displayed on said display device; and enable a second operating mode when said detected current orientation corresponds to a second orientation of said electronic device, said second operating mode comprising: rendering said user interface on said rendering screen and enabling a user of said electronic device to interact with said user interface rendered on said rendering screen.

12. The system of claim 11, wherein said orientation module is further operable to detect an orientation change of said electronic device; and said electronic device is further operable to switch from said first to said second operating mode, or vice versa, in response to said detected orientation change.

13. The method of claim 1, wherein said first orientation of said electronic device corresponds to a portrait orientation for which a user holds said electronic device in a vertical position; and said second orientation corresponds to a landscape orientation for which said user holds said electronic device in a horizontal position; or vice versa.

14. The method of claim 2, wherein said detecting an orientation change comprises detecting said electronic device being switched from a portrait to a landscape orientation, or vice versa.

15. The method of claim 2, wherein said switching comprises switching from said second to said first operating mode in response to said orientation change and said method further comprises:
stopping rendering said user interface on said rendering screen; and
displaying said user interface on said display device associated with said client device.

16. The method of claim 15, wherein said displaying said user interface on said display device comprises:
saving visual and execution states of said user interface rendered on said rendering screen at a time said orientation change is detected;
customizing said user interface according to characteristics of said display device; and
displaying said customized user interface on said display device, said customized user interface being resumed on said display device at said saved visual and execution states.

17. The method of claim 16, wherein said characteristics comprises one or more of: aspect ratio, dimension, or resolution of said display device.

18. The method of claim 16, wherein said customizing said user interface comprises retrieving relevant metadata suitable for use on said display device.

19. The method of claim 15, wherein said displaying said user interface on said display device further comprises:
synchronizing said stopping rendering said user interface on said rendering screen and said displaying said user interface on said display device according to a visual animation.

20. The method of claim 19, wherein said synchronizing comprises:
defining a start time and a duration for said visual animation; and
starting said stopping rendering and displaying operations at said defined start time to be performed for said duration.

* * * * *

UNITED STATES PATENT AND TRADEMARK OFFICE
CERTIFICATE OF CORRECTION

| | |
|---|---|
| PATENT NO. | : 9,197,844 B2 |
| APPLICATION NO. | : 14/238126 |
| DATED | : November 24, 2015 |
| INVENTOR(S) | : Gardes et al. |

It is certified that error appears in the above-identified patent and that said Letters Patent is hereby corrected as shown below:

In the claims,
In column 11, line 39, (sixth line of claim 9), delete "said first display" and substitute therefor --said display--.

Signed and Sealed this
Twelfth Day of April, 2016

Michelle K. Lee
*Director of the United States Patent and Trademark Office*